United States Patent [19]

Loran

[11] 4,213,870

[45] Jul. 22, 1980

[54] CLEANING AND LUBRICATING COMPOSITIONS AND METHOD OF USING THE SAME

[76] Inventor: Thomas J. Loran, Boulder Canyon, Boulder, Colo. 80302

[21] Appl. No.: 820,351

[22] Filed: Jul. 29, 1977

[51] Int. Cl.$^2$ ............................................. C10M 1/32
[52] U.S. Cl. ............................ 252/51.5 R; 15/104.94; 252/11; 252/54.6; 252/58; 427/11; 427/127; 428/421; 428/422; 428/900
[58] Field of Search ............ 252/54.6, 58, 11, 51.5 R; 15/104.94; 427/11; 428/421, 422, 900

[56] References Cited

U.S. PATENT DOCUMENTS

| | | | |
|---|---|---|---|
| 3,329,611 | 7/1967 | Chao ................................... | 252/54.6 |
| 3,637,497 | 1/1972 | Fitz Simmons ..................... | 252/54.6 |
| 3,637,791 | 1/1972 | Pittman et al. ..................... | 252/54.6 |
| 3,646,112 | 2/1972 | Sterling ............................... | 252/54.6 |
| 3,704,277 | 11/1972 | Clark .................................. | 252/54.6 |
| 3,784,471 | 1/1974 | Kaiser ................................ | 252/54.6 |
| 3,862,860 | 1/1975 | Pardee et al. ...................... | 428/900 |

*Primary Examiner*—Andrew Metz
*Attorney, Agent, or Firm*—John E. Reilly

[57] ABSTRACT

Compositions including fluorinated alkyl esters are provided. Such compositions are useful for cleaning and lowering the coefficient of friction of the surfaces of various articles. In certain preferred embodiments tetrafluorethylene telomers and/or antistatic materials are included in the compositions.

16 Claims, No Drawings

CLEANING AND LUBRICATING COMPOSITIONS AND METHOD OF USING THE SAME

BACKGROUND OF THE INVENTION

1. Field of the Invention

The present invention relates to compositions of lubricants for use on moving solid surfaces. More specifically, it relates to halogen containing lubricant compositions. It also relates to solutions containing such compositions, applicators for applying such composition, methods of utilizing said compositions and to the articles produced by the use of said compositions.

2. Description of the Prior Art

Mechanically speaking, many solid objects are utilized by placing them in contact with and in relative motion to other solid objects. In such systems, in order to avoid or control destructive mechanical wear between the objects, one or more of the objects should be produced of low coefficient of friction wear resistant material or coated with lubricants to lower their coefficient of friction. Choosing suitably wear resistant materials or providing adequate lubrication represents an especially difficult problem in the field of information storage. Modern technology has provided means for dynamic storage and playback of information in the form of media such as sound recording disks (phonograph records) magnetic tape and disks, and projectable photographic film. Generally speaking, both the recording and the playback of such media requires relative motion between the media and a transducer. In even the most elegant systems there tends to be destructive wear upon the media by its very use, and unless steps are taken to protect the media, it can be quickly and irretrievably destroyed.

Perhaps the most commonly utilized form of media is sound recording disks. With the advent of sophisticated high fidelity playback equipment, audiophiles have made extensive investments in both equipment and phonograph records. Because of the extreme sensitivity of modern playback equipment, the slightest imperfection, wear, or dirt on the record can become a great aesthetic irritant to the user. Additionally, unless the record is protected in some way, its very use will cause it to be worn and will eventually destroy its utility. Similar problems exist with regard to the use of magnetic media and photographic film. In the use of each of these media substantial friction and wear can be generated by the relative movement of the media with respect to its transducer.

By their nature, each of these media is difficult to protect from destructive wear. These media are generally relatively soft by comparison with the drive and transducer systems with which they are utilized. Therefore, it order to be utilized effectively, while avoiding destruction, they must be provided with a low coefficient of friction with respect to the environment through which they pass. Preferably, they are also provided with a protective wear coating, which coating has a low coefficient of friction. In this manner, the coating provides both a low coefficient of friction and a sacrificial surface which can be worn while leaving the actual media intact. It is difficult to provide a single composition which will coat and adhere to diverse substrates such as plastic sound recordings, metallic or polymeric magnetic media, and photographic film which is in the form of a plastic polyester or acetate substrate coated with a soft emulsion. Furthermore, it must be possible to provide the coating in such a thin layer, about 3 to 36 microinches (0.07 to 0.90 micron), that the coating will not reduce or distort the playback of mechanical or magnetic recordings. Additionally, where the coating is utilized for photographic films, it must be both transparent and colorless.

In the prior art, both oils, waxes, and coatings containing oils and waves have been utilized to lubricate media. Fluorinated lubricants have been disclosed for this purpose, for example, in U.S. Pat. Nos. 3,490,946 and 3,862,860. There are numerous other patents relating to surface lubrication and coating. Of recent interest are U.S. Pat. Nos. 3,778,308 and 3,919,719. Surfactants have not been taught as having utility as wear resistant coatings or lubricants.

SUMMARY OF THE INVENTION

The present invention consists of compositions including fluorinated alkyl esters, which provide a low coefficient of friction coating for the surface of an article. These compositions are useful for cleaning and lowering the coefficient of friction of the surface of various articles. In certain preferred embodiments tetrafluoroethylene telomers and/or antistatic materials are included in the compositions. Fluorinated alkyl esters are normally provided for use only as surfactants.

Accordingly, an object of the present invention is to provide a composition which, when applied to a surface, cleans the surface and lowers its coefficient of friction.

Another object of the present invention is to provide a composition and method which, when applied to a surface, imparts a protective coating.

Yet another object of the present invention is to provide a composition and method which, when applied to a surface, imparts a protective coating.

Yet another object of the present invention is to provide a composition and method which produces a low coefficient of friction protective coating on sound recording disks.

A further object of the present invention is to provide an improved, thin coating for substrates having data stored thereon and which are subjected to relative mechanical motion when used.

The foregoing and other objects, features and advantages of the invention will be apparent from the following more particular description of preferred embodiments of the invention.

DETAILED DESCRIPTION OF THE INVENTION

According to the present invention, fluorinated alkyl ester containing compositions are provided which are capable of being coated on the surface of an article to provide abrasion resistance, a low friction surface, and which coating is capable of carrying high loads that would normally damage a surface. The compositions are also characterized by low surface tension so that they easily wet and adhere to surfaces of almost any material, without regard to the degree of cleanliness of those surfaces. The compositions consist of a mixture including relatively high molecular weight, normally solid, fluorinated alkyl esters which provide a hard, wear resistant matrix coating.

It is most surprising that fluorinated alkyl esters can serve as a useful coating matrix in these compositions, as these materials are normally provided for use as surfactants. The particular fluorinated alkyl esters preferred in this application are known as Fluorad fluorochemical surfactants, a trademarked product of 3M Company. More specifically, the fluorinated alkyl ester Fluorad surfactants designated as FC-430, FC-431, and FC-432 have been found to be useful as matrix binders in the practice of the present invention. These compositions include a chemical structure including a fluorinated alkyl hydrophobic tail terminating in a hydrophilic ester group. These materials are reported to have a structure:

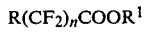

wherein R is H, CF$_3$ R$^1$ is a short chain alkyl compound, and n is equal to a positive integer such that the molecular weight of the ester compound is equal to or greater than 300. The utility of these compositions as a coating matrix, as taught and claimed herein, is quite surprising, as these materials are primarily designated for use as surfactants and not as coating matrices. Of additional benefit, due to their surfactant nature, when they are used as a coating matrix in a liquid solvent composition, they provide for excellent wetting of the to-be-coated surface and good spreading of the coating composition on said surface. This appears to enhance their character as a good, adherent coating composition. The higher molecular weight fluorinated alkyl esters having molecular weights of about 300 or more are preferred. FC-432 has a higher molecular weight than FC-431, which in turn has a higher molecular weight than FC-430. Mixtures of these fluorinated alkyl esters can also be utilized in the compositions of the present invention.

When utilized as coating compositions, the fluorinated alkyl esters provide a thermoplastic coating. As used herein, the term thermoplastic is intended in its normally understood sense. Fluorinated alkyl esters are provided by any number of techniques. In one method of production, a fluorinated alkyl acid is reacted with an organic alcohol to produce the desired ester. In another technique, a fluorinated alkyl of the desired chain length, is reacted so that its termination includes either an alcohol or an acid group. It is then subsequently reacted with an organic alcohol or acid, as the case may be, to produce the desired ester.

Tetrafluoroethylene telomers useful in the practice of certain preferred embodiments of the present invention are available from a number of sources, for example, under the tradename VYDAX AR, a trademarked product of E. I. duPont de Nemours & Company. The material has an average molecular weight of about 3,700 and melts at about 300° C. Additional data on suitable tetrafluoroethylene telomers may be found in U.S. Pat. No. 3,067,262.

Of course the present invention is not limited to the specific commercial compositions exemplified herein. In some instances, it may be desirable to purify the commercial chemicals used in the practice of the present invention. This can be achieved by, for example, first evaporating the solvents in which the commercial compositions are normally supplied, redissolving the solids in another solvent, removing the freshly dissolved components by decanting, or any of the other procedures, and then once again drying the supernatant solution to provide a purified solid. Solvents useful in this purifying step include trichlorotrifluoroethane although any number of other solvents are useful for this purpose, including halogenated aliphatic hydrocarbons.

The molecular weights of the tetrafluoroethylene telomers utilized in the present invention do not appear to be critical. However, the fluorinated alkyl esters should be chosen to provide characteristics, such as molecular weight greater than about 300, such that they will normally be solid under ambient conditions.

In addition to the fluorinated alkyl esters and the tetrafluoroethylene telomers, other ingredients may be beneficially utilized in the composition. In one preferred embodiment antistatic agents can be included in the coating. This is an especially useful additive where information carrying media is to be coated and static build-up on the media could encourage accumulations of dirt and dust which would be detrimental to their operation and wear. Any compatible commercial antistatic agent can be utilized for this purpose. For example, Drewplast 017, a tradenamed product of PVO International, Inc., an ester having the following structural formula is useful in this purpose:

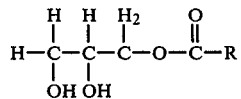

Wherein R is H, or an organic radical containing 6 or less carbon atoms.

Another useful, but chemically unrelated antistatic agent, which may be incorporated in the composition, is Sandin PU, a product of Sandoz Colors and Chemical Company. Sandin PU is an amine.

The compositions of the present invention are applied to substrates, such as phonograph records, magnetic recording media, and photographic film in any number of ways. In one preferred embodiment, described in more detail in copending U.S. Application Ser. No. 820,232, referred to above, the composition is applied to an applicator substrate and allowed to dry. The composition is then applied to the to-be-coated substrate by wiping the surface with the composition containing applicator. In other preferred methods, the composition is applied to the substrate as a solution in a suitable solvent and the solvent is allowed to evaporate. This solution application is preferably accomplished by means of a spray, either from a pump mechanism, or a self-contained aerosol container. Of course other means of solution coating may be utilized as desired. These include brushing, flowcoating, dipping, doctoring and other well known techniques.

While in the preferred embodiments, the media substrates to-be-coated will normally be of plastic or polymeric solid materials, other solid materials such as wood, metal, glass, paper, and leather may be treated with the compositions of the present invention to lower their coefficients of friction and improve their wear characteristics. In some instances dry buffing the coating, after it is applied, may improve the uniformity and distribution of the coating. However, dry buffing is optional and is normally a matter of choice. While the best results are achieved when the various components of the composition are first mixed together prior to application, some beneficial use may be accomplished, in accordance with the teaching of the present invention, by first coating either the fluorinated alkyl esters, or another ingredient such as tetrafluoroethylene telomer, onto the substrate individually and subsequently applying other ingredients to the substrates. This provides results which, in some instances, may be as satisfactory as applying the composition as a mixture.

While the thickness of the coating provided by the compositions of the present invention are not crtical, there are preferred thicknesses, some of which may be important based upon the use to which the coating composition is placed. For example, a coating thickness of a minimum of about 0.025 micron (1 microinch) will provide a minimum thickness coating which can be relied upon to provide useful results. Coating thicknesses in the range of about 0.07 to about 0.90 micron (about 3 to 36 microinches) are effective to lubricate and protect media such as phonograph records, magnetic media and photographic film. Coating thicknesses of about 0.12 to about 0.50 micron (about 5 to 20 microinches) have been found to be especially effective for phonograph records to supply good wear protection without causing distortion or signal loss. Coating thicknesses greater than about 2.0 microns (about 80 microinches) will seldom be required to achieve lubrication of wear protection, although thicker coatings can be utilized where they will have no deleterious effect on the utility of the coated object.

The compositions of the present invention may vary somewhat, but should be such that it either lowers the coefficient of friction or improves the wear of the article upon which it is coated. Where compositions of fluorinated alkyl esters and tetrafluoroethylene telomers are used in combination, the esters may effectively constitute from about 2% to about 95% of the composition while the telomers may constitute from about 5% to about 98% of the composition. One preferred composition includes about 5% fluorinated alkyl esters and about 95% tetrafluoroethylene telomers. Where compositions of fluorinated alkyl esters and antistatic agents are utilized in combination, the esters may effectively constitute from about 15% to about 85% of the composition while the antistatic agent may also constitute from about 15% to about 85% of the composition. One preferred composition includes about 25% fluorinated alkyl esters and about 75% antistatic agents. Where the compositions include fluorinated alkyl esters, tetrafluoroethylene telomers and antistatic agents, then the composition may constitute from about 1% to about 98% esters, from about 1% to about 85% telomers and from about 1% to about 60% antistatic agents. One preferred composition includes about 5% fluorinated alkyl esters and about 48% tetrafluoroethylene telomers and about 47% amine antistatic agents. As used herein, both above and hereinafter, "percent (%)" or "parts" means "by weight".

In addition to tetrafluoroethylene telomers and antistatic agents, the compositions of this invention may also contain other ingredients such as conventional fillers, coloring agents, fragrances, and the like so long as the quantity thereof does not prevent the composition from adhering to the surface of the substrate and does not destroy the lubricating character of the coating.

In many applications the compositions of the present invention are dissolved in suitable solvents and applied as a solution. Suitable solvents for this purpose are, for example: fluorinated hydrocarbons; chlorinated hydrocarbons such as ethylene chloride, trichloroethane, methylene chloride, chloroform, carbon tetrachloride and perchloroethane; aromatic hydrocarbons such as benzene, toluene and heptane; and chlorofluorocarbons such as trichlorotrifluoroethane. The compositions are slightly soluble in water, alcohols, acetates and ketones. The choice of solvents and the relative concentration of the composition depends on to use to which the solution is to be placed. Where thin coatings are desired, as on media, dilute solutions in the range of about at least 0.01 to about 0.10% solids, by weight, are useful. Specifically, for spray coating phonograph records, solutions of about 0.08% solids, by weight, are preferred. Seldom would any use require a solution containing more than about 5% solids, by weight.

The compositions of the present invention are transparent and colorless and can be utilized to coat photographic film without any deleterious effects.

EXAMPLE I

A lubricating composition according to the present invention was prepared containing 25% fluorinated alkyl esters and about 75% purified tetrafluoroethylene telomer. This composition was dissolved in trichlorotrifluoroethane solvent to provide a 2% solution. The solution was sprayed on a magnetic disk and tested for durability of the coating. Testing was by means of the well known pin and disk technique wherein a one-quarter inch diameter ceramic ball, loaded with 80 grams, is placed on the disk at a distance of 7 inches from the center of the disk and the disk rotated at 60 revolutions per minute. The composition so applied supported the load for 840 cycles of the disk.

Utilizing similar techniques, a coating containing only 2% purified tetrafluoroethylene telomers was applied to a disk and the disk tested in a similar manner. Utilizing only the tetrafluoroethylene telomer, the coating was capable of supporting the ceramic ball for only 600 cycles before it failed. Thus, utilizing one preferred composition of the present invention, the wear resistance of the composition is seen to be approximately 40% greater than that of tetrafluoroethylene telomers by themselves.

EXAMPLE II

It has been determined that utilizing a composition of fluorinated alkyl esters with the addition of materials such as antistatic agents, can greatly lower the coefficient friction of both the ester and the antistatic agent and provide a useful lubricant and wear resistant coating composition. For example, a composition containing 5.6 grams of purified fluorinated alkyl ester and 6.0 grams of a conventional amine antistatic agent such as Sandin PU was dissolved in trichlorofluorethane to provide a 0.12% solution, then applied, by spraying, to the substrates listed below and the coefficient of friction measured by the incline plane method as described in SMPTE Journal, Vol. 80, September 1971, pp. 734–739.

For purposes of comparison, solutions containing only the fluorinated alkyl ester and only the antistatic agent were also prepared, applied in the same manner, and tested for friction.

TABLE 1

| SUBSTRATE | CONDITION | COEFFICIENT OF FRICTION |
|---|---|---|
| Movie Film Leader | Untreated | 0.30+ |
| Movie Film Leader | Coated only with fluorinated alkyl ester | 0.13 |
| Movie Film Leader | Coated only with antistatic agent | 0.12 |
| Movie Film Leader | With coating of Example II | 0.10 |
| Magnetic Tape | Untreated | 0.30 |

TABLE 1-continued

| SUBSTRATE | CONDITION | COEFFICIENT OF FRICTION |
|---|---|---|
| Magnetic Tape | With coating of Example II | 0.20 |

It is thus seen that the composition containing both a fluorinated alkyl ester and an antistatic agent greatly improves the coefficient of friction of the material treated.

It will also be noted from Table I that while use of the ester alone lowers the coefficient of friction and while use of the antistatic agent alone also lowers the coefficient of friction, that the combination of the ester and the antistatic agent provides a synergistic effect with an improvement of from about 20 to 30% in lowered coefficient of friction of the combination over the individual components.

Similar results were obtained when the composition of fluorinated alkyl ester and antistatic agent was coated on a substrate to an applicator, allowed to dry, and then the applicator wiped on the film leader. Again, utilizing this technique of dry application from an applicator, the friction of the leader was lowered from 0.30 to 0.11.

EXAMPLE III

A coating containing 50% fluorinated alkyl ester and 50% antistatic agent was applied to a phonograph record, and the phonograph record was rubbed with wool four times. No static charge could be induced on the surface of the phonograph record. When the untreated opposite side of the same phonograph record was rubbed with wool four times a static charge was induced, which charge was still present when tested for, after 30 minutes.

EXAMPLE IV

A composition containing approximately 5% fluorinated alkyl esters, 53% purified tetrafluoroethylene telomers and 42% amine antistatic agent was dissolved in trichlorotrifluoroethane to form an 0.08% solution. The resulting solution was utilized to clean and coat phonograph records. It was found to efficiently and effectively clean the record and provide it with an antistatic coating. It also eliminated or reduced record wear. It was found to not fill the grooves of the record surface. Repeated applications of the composition to the record did not result in build-up of the coating or filling of the grooves. Of great importance it was found that this coating composition did not change the frequency output of the record and that it kept the harmonic distortion low. There was noticeably less wow and flutter and test data showed that the record had a lower coefficient of friction with the coating than without the coating. A single sprayed application was sufficient for at least 50 plays of the record without destroying the coating using average turntable, stylus and stylus loading. Over a period of time it was noted that this coating prevented dust accumulation due to the lack of static electric build-up.

EXAMPLE V

The composition of the foregoing example was applied to a substrate to form an applicator and allowed to dry. When the applicator was rubbed on a phonograph record, it was found to duplicate the results achieved by the solution by Example IV. The use of dry applicators may be environmentally important as there is growing concern as to the effect which chloro-fluorocarbon solutions have upon the atmosphere and the earth's ozone layer.

It is apparent from the foregoing examples and description that the present invention provides compositions which are useful in improving wear and lowering the coefficient of friction. The combination of fluorinated alkyl esters with other ingredients, including tetrafluoroethylene telomers and antistatic ingredients provides coatings which have coefficients of friction lower than the coefficients of friction of the original article or of the individual components. Further, methods of coating materials to improve their wear characteristics and to lower their coefficients of friction have been shown. Applicators containing the compositions have been taught. Articles coated with the compositions of the present invention have improved wear characteristics and lower coefficients of friction.

While several specific preferred embodiments of the present invention have been shown, it will be apparent to those skilled in the art that numerous changes and modifications may be made within the scope of the invention, and that such changes may be made without departing from the spirit and scope of the invention as defined by the following claims.

What is claimed is:

1. A lubricating composition consisting essentially of:
   fluorinated alkyl esters including a chemical structure having a fluorinated alkyl hydrophobic tail terminating in a hydrophilic ester group and having the structure $$R(CF_2)_nCOOR'$$

wherein R is a material selected from the group consisting of H and $CF_3$, R' is a short chain alkyl compound, and n is equal to a positive integer such that the fluorinated alkyl esters have a relatively high molecular weight on the order of at least 300 which are normally solid under ambient conditions; and
   another material selected from the group consisting of at least one of tetrafluoroethylene telomers and compatible anti-static agents.

2. The composition of claim 1 wherein said lubricating composition includes a filler compatible with the ingredients of said composition.

3. The compositions of claim 1 wherein the fluorinated alkyl esters constitute from about 1% to about 98%, by weight of the composition, the tetrafluoroethylene telomers constitute from about 1% to about 85%, by weight of the composition, and the compatible anti-static agents constitute from about 1% to about 60%, by weight of the composition.

4. The composition of claim 1 wherein the fluorinated alkyl esters constitute about 5%, by weight of the composition, the tetrafluoroethylene telomers constitute about 48%, by weight of the composition, and the compatible antistatic agents constitute about 47% by weight of the composition.

5. The composition of claim 1 wherein the antistatic agent is an amine.

6. A solution of the composition of claim 1 dissolved in chlorofluorocarbon solvents.

7. A solution of the composition of claim 1 dissolved in trichlorotrifluorethane.

8. The method of lubricating the surface of an article comprising the steps of:

intermixing a fluorinated alkyl ester having a relatively high molecular weight which is normally solid under ambient conditions with a material selected from the group consisting of tetrafluoroethylene telomers and anti-static agents compatible with said fluorinated alkyl esters and together with a volatile solvent for the composition; and applying said mixture in a thin film to the surface to be lubricated whereby when the solvent evaporates a solid, wear-resistant lubricant coating is left upon the surface.

9. The method according to claim 8 in which the surface to be lubricated is a plastic material.

10. The method according to claim 8 wherein the surface to be lubricated is a magnetic tape.

11. The method according to claim 8 wherein a minor proportion of the fluorinated alkyl ester is intermixed with a major proportion of an anti-static agent.

12. A lubricating composition adapted for application in the form of a solid coating to the surface of a plastic article comprising:

a fluorinated alkyl ester including a chemical structure having a fluorinated alkyl hydrophobic tail terminating in a hydrophilic ester group, said fluorinated alkyl ester having the structure $$R(CF_2)_n COOR'$$

wherein R is a material selected from the group consisting of H and $CF_3$, R' is a short chain alkyl compound and n is equal to a positive integer such that the fluorinated alkyl ester has a relatively high molecular weight on the order of 300 which is normally solid under ambient conditions; and a material selected from the group consisting of tetrafluoroethylene telomers and compatible anti-static agents, and mixtures of same.

13. The composition of claim 12 comprising 2% to 95% by weight of said fluorinated alkyl esters and from 5% to 98% by weight of said tetrafluoroethylene telomers.

14. The composition of claim 13 comprising 5% by weight of fluorinated alkyl ester to 95% by weight of tetrafluoroethylene telomer.

15. The composition of claim 12, comprising about 5% fluorinated alkyl ester, about 48% tetrafluoroethylene telomer and about 47% anti-static agent.

16. The method of lubricating the surface of a plastic material comprising the steps of:

intermixing a fluorinated alkyl ester with a material selected from the group consisting of tetrafluoroethylene telomers and anti-static agents compatible with said fluorinated alkyl esters together with a volatile solvent for the composition, said fluorinated alkyl esters having a fluorinated alkyl hydrophobic tail terminating in a hydrophibic ester group as defined by the structural formula $$R(CR_2)_n COOR'$$

wherein R is a material selected from the group consisting H and $CF_3$, R' is a short chain alkyl compound, and n is equal to a positive integer such that the fluorinated alkyl ester has a relatively high molecular weight which is normally solid under ambient conditions; and applying said intermixture in a thin film to the surface to be lubricated whereby when the solvent evaporates a hard, solid wear-resistant lubricant coating is left upon the surface.

* * * * *

UNITED STATES PATENT AND TRADEMARK OFFICE
CERTIFICATE OF CORRECTION

PATENT NO. : 4,213,870
DATED : July 22, 1980
INVENTOR(S) : Thomas J. Loran

It is certified that error appears in the above—identified patent and that said Letters Patent is hereby corrected as shown below:

IN THE ABSTRACT:
Line 5, cancel "tetrafluorethylene" and substitute -- tetrafluoroethylene --.

IN THE SPECIFICATION:
Column 5, line 20, cancel "of" and substitute -- or --.
Column 7, line 67, cancel "by" and substitute -- of --.

IN THE CLAIMS:
Claim 7, Column 8, line 68, cancel "trichlorotrifluorethane" and substitute -- trichlorotrifluoroethane --.
Claim 16, Column 10, line 22, cancel "hydrophibic" and substitute -- hydrophilic --.
Claim 16, Column 10, line 28, after "consisting" add -- of --.

Signed and Sealed this

Fourteenth Day of April 1981

[SEAL]

Attest:

RENE D. TEGTMEYER

*Attesting Officer*          *Acting Commissioner of Patents and Trademarks*